United States Patent
Markert

(10) Patent No.: US 6,877,392 B2
(45) Date of Patent: Apr. 12, 2005

(54) GEAR, PARTICULARLY FOR A ROBOT

(75) Inventor: Joachim Markert, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 09/885,566

(22) Filed: Jun. 20, 2001

(65) Prior Publication Data

US 2002/0007689 A1 Jan. 24, 2002

(30) Foreign Application Priority Data

Jul. 18, 2000 (DE) .................................. 200 12 444 U

(51) Int. Cl.[7] .............................................. B25B 17/00
(52) U.S. Cl. ............... 74/490.05; 74/421 A; 74/490.06; 901/25; 901/29
(58) Field of Search .......................... 74/490.05, 490.08, 74/421 A, 420, 421 R, 665 L, 665 M, 665 N; 901/25, 29

(56) References Cited

U.S. PATENT DOCUMENTS

| | | | | |
|---|---|---|---|---|
| 2,983,163 A | * | 5/1961 | Pettavel | .................... 74/665 L |
| 3,108,498 A | * | 10/1963 | James et al. | .................... 475/5 |
| 3,234,808 A | * | 2/1966 | Nelson | .................... 74/421 A |
| 4,147,071 A | * | 4/1979 | Scribner et al. | .................... 74/409 |
| 4,259,809 A | * | 4/1981 | Mabuchi et al. | .................... 446/58 |
| 4,526,252 A | * | 7/1985 | Hirano | .................... 187/254 |
| 4,589,816 A | * | 5/1986 | Eberle et al. | .................... 414/680 |
| 4,592,697 A | | 6/1986 | Tuda et al. | |
| 4,685,861 A | * | 8/1987 | Huetsch | .................... 414/729 |
| 4,802,372 A | * | 2/1989 | Harrod et al. | .................... 74/325 |
| 4,840,090 A | * | 6/1989 | Iwata | .................... 74/640 |
| 4,841,811 A | * | 6/1989 | Bajulaz | .................... 475/180 |
| 5,203,748 A | | 4/1993 | Sawada et al. | |

FOREIGN PATENT DOCUMENTS

| | | | |
|---|---|---|---|
| EP | 1 172 182 | 1/2002 | |
| FR | 2613449 A1 | * 10/1988 | .............. B25J/9/10 |
| JP | 04025393 | 1/1992 | |

\* cited by examiner

*Primary Examiner*—David A. Bucci
*Assistant Examiner*—Timothy McAnulty
(74) *Attorney, Agent, or Firm*—McGlew and Tuttle, P.C.

(57) ABSTRACT

In a gear, particularly for a robot, with a drive shaft and at least two parts rotatable relative thereto and to one another, in which a movement of one part is removable on its side remote from the other part, at least one of the rotary parts has a shaft connected in non-rotary manner thereto and which projects at least to the other part.

24 Claims, 6 Drawing Sheets

GEAR, PARTICULARLY FOR A ROBOT

FIELD OF THE INVENTION

The invention relates to a gear, particularly for a robot, having a drive shaft and at least two parts relative to the latter and to one another, in which a movement of one part is removable on its side remote from the other part, as well as a robot equipped with at least one such gear.

BACKGROUND OF THE INVENTION

Multiaxial robots are e.g. known in the form of industrial robots and are used for the automatic performance of transportation and working processes. They generally have a carousel placed on a frame and rotatable about a primary axis and a structure mounted on the carousel and having a robot arm pivotable about several axes. For the mutual pivoting of the rotation axis of the robot, e.g. for rotating the carousel with respect to the stationary frame, gears are provided with a drive shaft and at least two parts rotatable relative to the latter and to one another, such as two half-shells or a gear shaft and a gearbox, on which is fixed in each case one of the robot parts pivotable about the particular robot axis. The movement of one part, e.g. the gearbox, must therefore be removable on its side remote from the other part, e.g. the gear shaft. The drive shaft is generally in operative connection with a drive motor.

In order to ensure a completely satisfactory and precise operation of the robot, sensor devices are required, which monitor and optionally limit the angular positions of the robot axes, so that an actual path of the angular position of the robot axes comparable with a desired path is obtained and the actual values can if necessary be adapted to the desired values.

It is often frequently desirable to subject an additional torque to at least one of the robot parts and this is scarcely possible with a conventional gear.

The problem of the invention is to further develop a gear of the aforementioned type in a simple and inexpensive manner in such a way that an arrangement of additional devices integrated into the gear, e.g. a sensor device or a device for subjecting one of the gear parts rotatable relative to one another with a torque, e.g. an auxiliary motor is possible.

SUMMARY OF THE INVENTION

According to the invention this problem is solved in the case of a gear of the aforementioned type in that at least one of the rotary parts has a shaft connected in non-rotary manner thereto and which extends at least up to the other part.

As a result of the construction according to the invention an additional shaft is provided connected in non-rotary manner with the rotary part of the gear and having an arrangement of additional devices, such as sensor devices, movement limiting devices, auxiliary motors, etc., integrated into the gear, e.g. arranged within the same or directly on the same, located on the side of one gear part facing the other part. Therefore the movement of the one rotary part of the gear equipped with the additional shaft both on its side remote from the other gear part rotatable relative thereto, such as is known in the case of conventional gears and also on its side facing the other part on the shaft projecting thereto, which in particular permits a determination of the relative movement of the two gear parts rotatable relative to one another.

Whereas the movement of the one gear part provided with the additional shaft projecting to the other gear part can fundamentally be removed on the side of the other part facing said part, according to a preferred development the shaft located on one part traverses the other part to its side remote from the first part. In this way the movement of the one part can be removed by means of the shaft traversing the other part on the side of the latter remote from the part with the shaft, which is particularly advantageous for space saving reasons in the case of a robot in order to bring about a high compactness of the gear or the complete arrangement of the robot joint.

According to a preferred construction the shaft located on the one part is the drive of a sensor device located in and/or on the other part and the sensor device can e.g. be constructed as a monitoring device for determining and/or limiting rotation parameters. As a result of the inventive gear construction in the case of such a sensor device integrated into the gear mechanical damage or dirtying of the sensor device is largely avoided and consequently it is possible to ensure a continuous determination and monitoring of the angular position of the rotation axis and optionally limit the rotation angle. The integration of the sensor device into the gear also leads to a more compact construction of the robot, excluding an undesired restriction to the mobility of the robot rotation axes as a result of the sensor device.

According to a preferred development the sensor device has a stub shaft guided in a receptacle and determines the rotation angle between stub shaft and receptacle. Such sensor devices are known per se. They are generally positioned substantially coaxially to the robot rotation axis and have e.g. on the face of the stub shaft located in the receptacle optical, magnetic or electromagnetic transducers, which determine and/or monitor the angular position of the particular rotation axis. On rotating the transducer or stub shaft with respect to the receptacle of the sensor device, the rotation angle is determined by a mechanism located in the receptacle, such as a diode in conjunction with a photoreceiver.

Whereas the sensor device receptacle is advantageously placed on one gear part, the sensor device stub shaft is preferably connected in non-rotary manner to the shaft located on the other gear part projecting up to or traversing the first gear part. If e.g. the one gear part is constructed in the manner of a gearbox and the other part in the manner of a gear shaft, then the sensor device receptacle can be positioned in the vicinity of the gear shaft face facing the gearbox and substantially coaxially to the robot rotation axis, whereas the stub shaft is located on the gear shaft projecting up to the gearbox. The receptacle can either be located on the inside facing the gear shaft or on the gearbox outside remote from the gear shaft, the stub shaft connected in non-rotary manner to the gear shaft in the latter case traversing the gearbox.

Alternatively e.g. the sensor device receptacle can be connected in non-rotary manner to the gear shaft, whilst the stub shaft is located on the gearbox shaft projecting up to and e.g. traversing the gear shaft. The monitoring device can therefore be positioned e.g. in the vicinity of the gear shaft face facing or also remote from the gearbox.

As has already been stated, in a preferred construction there is an optical, electrical, electromagnetic or magnetic monitoring device, particularly a resolver, which can e.g. be connected to a torque compensator for the particular rotation axis or to a control device for adapting the robot movement data.

According to another preferred construction the shaft located on one part can be subject to the action of a torque, which can e.g. be supplied by means of an auxiliary motor.

The drive shaft is preferably a high speed side driven shaft of a drive motor or is connectable thereto, so that the rotary parts of the gear can be moved at a lower speed than the drive shaft.

The shaft located on one rotary part of the gear and projecting to the other part is appropriately arranged coaxially to the rotation axis of at least one of the rotary parts of the gear and preferably both gear parts rotatable relative to one another are coaxially positioned.

The gear is preferably a high speed reducing spur, bevel, worm or epicyclic gear, e.g. a planetary gear. Preferably the gear is a harmonic drive gear. Harmonic drive gears comprise an outer race with internal teeth in which engage external teeth of a flexible tube. The tube diameter is somewhat smaller than the outer race width, so that tooth engagement only occurs when the tube is elliptically deformed by an oval or elliptical solid of revolution rotating in its interior. As there is a minor difference in the number of teeth of the tube (flexspline) and outer race, the in particular driven side tube rotates slowly when the in particular drive side solid of revolution rotates. Such gears have a very small clearance and achieve high reduction ratios. They were widely used in the past distributed in robots due to their high precision. They are now largely displaced by other gears as a result of their disadvantages (limited robustness, skipping of teeth in the case of high loading, limited reverse efficiency), so that nowadays their use is largely restricted to small robots and hand axes.

The drive motor can be central, eccentric or under a finite angle, particularly a right angle, to the rotation axis of at least one of the gear parts.

The invention also relates to a robot equipped with at least one gear of the aforementioned type.

BRIEF DESCRIPTION OF THE DRAWINGS

The invention is described hereinafter relative to an embodiment and the attached drawings, wherein show.

DETAILED DESCRIPTION OF THE DRAWINGS

Figure 1:
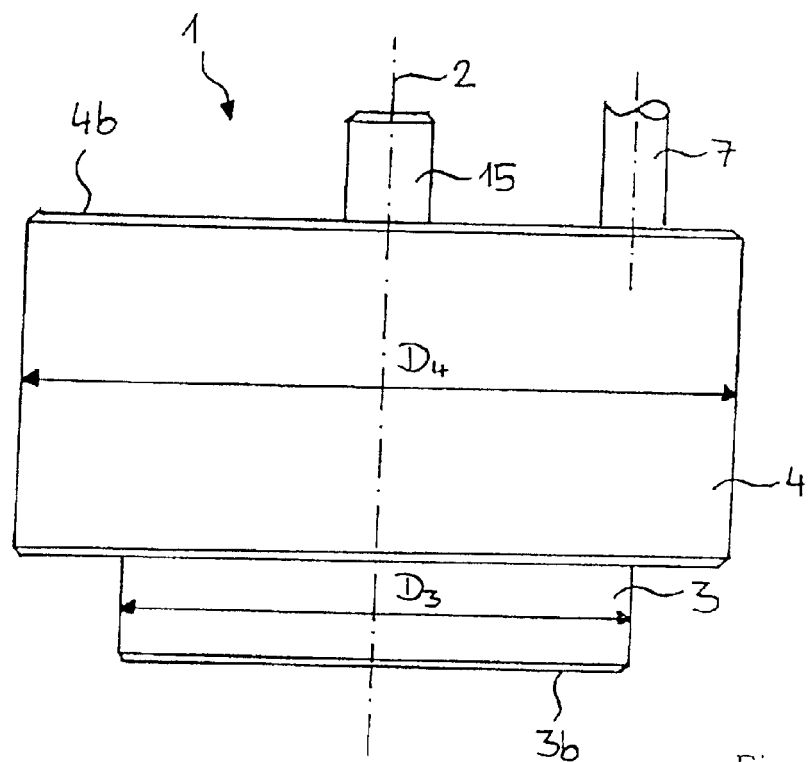
FIG. 1 A diagrammatic side view of a gear.

FIG. 1 shows a gear 1, particularly for a not shown robot, with a drive shaft 7 and two parts 3, 4 rotatable relative to the latter and to one another about a common rotation axis 2 and here in the form of a gear shaft 3 and gearbox 4 with different diameters D3, D4. In known manner the movement of the part 3 is removable on its side 3b remote from the part 4 and corresponding to the movement of part 4, relative to part 3 and also the drive shaft 7, can be removed on its side 4b remote from part 3. Part 3 has a shaft 15 projecting to part 4 and in the represented variant traversing the latter, so that the movement of part 3 can be additionally removed by means of the shaft 15 connected thereto on the side 4b of part 4 facing part 3. The shaft 15 can e.g. serve as a drive for a sensor device located in or on part 4, such as a not shown monitoring device for determining and/or limiting the rotation angle between parts 3, 4 or for the arrangement of a not shown auxiliary motor.

Figure 2:
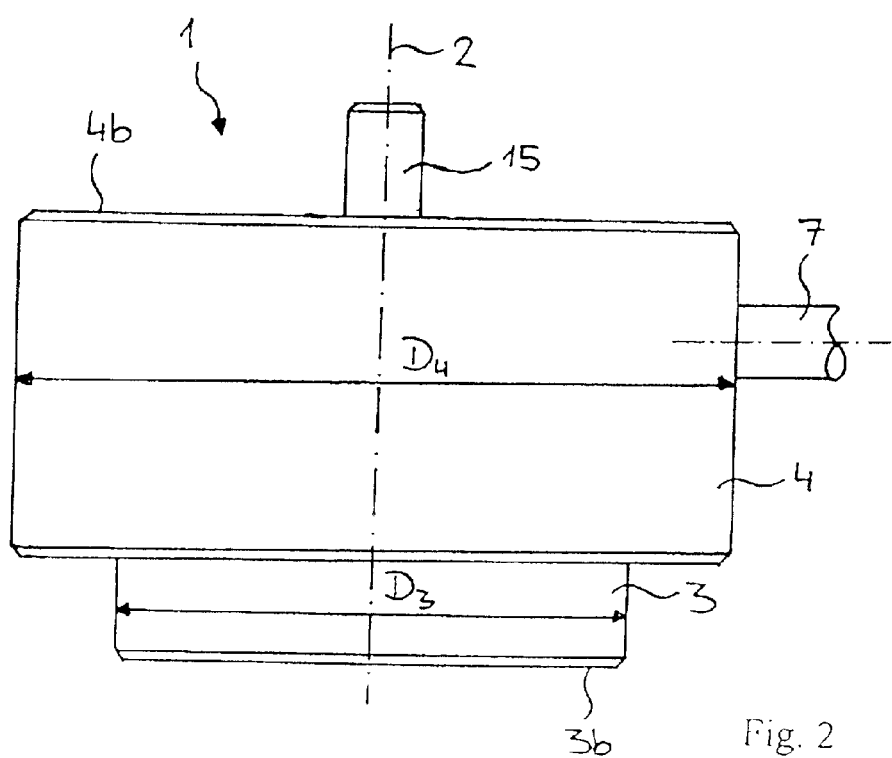
FIG. 2 A diagrammatic side view of an embodiment of the gear of FIG. 1.

Whereas in the case of the gear 1 shown in FIG. 1 there is a drive shaft 7 arranged eccentrically and parallel to the rotation axis 2 of parts 3, 4, the drive shaft 7 of gear 1 in FIG. 2 is at an angle of 90° to the rotation axis 2. The drive shaft 7 is in particular a high speed side drive shaft of a not shown drive motor or is connectable thereto, so that the parts 3, 4 can be moved at a speed lower than that of the drive shaft 7. The drive shaft 7 acting on the gear from the side of part 4 can obviously also act coaxially to the rotation axis 2 of gear 1 and/or from part 3.

Figure 3:
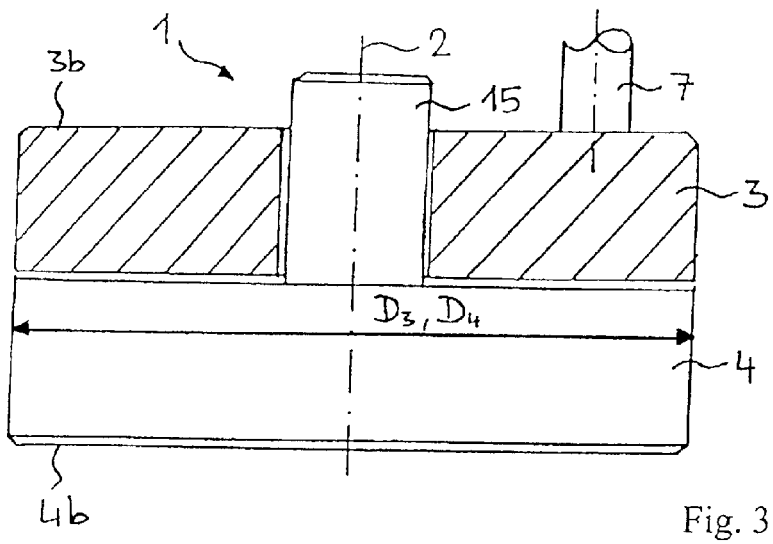
FIG. 3 A diagrammatic sectional view of another gear embodiment.
Figure 4:
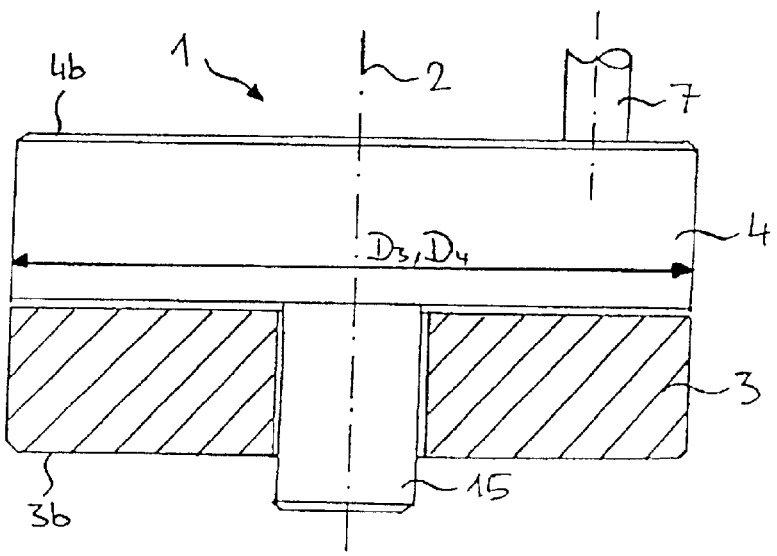
FIG. 4 A diagrammatic sectional view of a variant of the gear of FIG. 3.

FIG. 3 shows a gear 1 with two parts 3, 4 rotatable relative to one another and with roughly the same diameter D3, D4, in which a shaft 15 located on part 3 traverses part 4 to its side 4b remote from part 3. Whereas in the gear 1 of FIG. 3 there is a drive shaft 7 arranged eccentrically with respect to its rotation axis 2 engaging from the part 4 traversed by the shaft 15, the drive shaft of the gear 1 in FIG. 4 is arranged eccentrically to its rotation axis 2 and engaging from the part 4 having the shaft 5. In constructions of a gear as in FIGS. 3 and 4 the gear shaft and gearbox cannot be distinguished and the association is based solely on the definition through the fact that generally the drive motor casing is connected in non-rotary manner to the gearbox, which can consequently be referred to as such.

Figure 5:
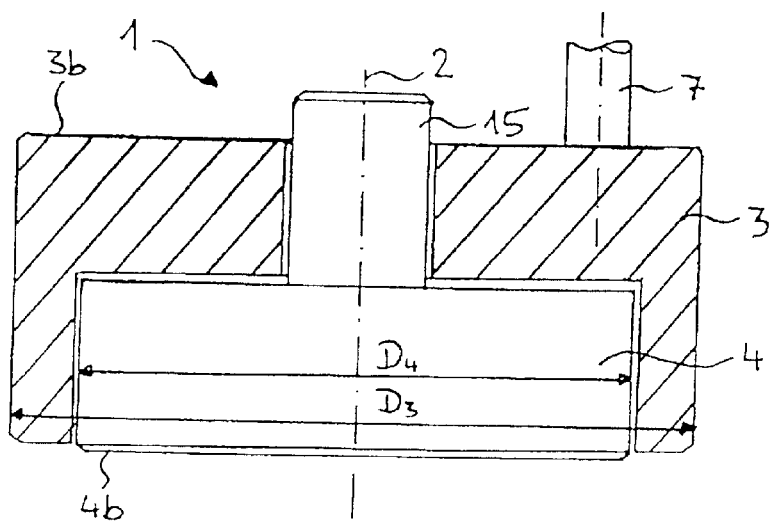
FIG. 5 A diagrammatic sectional view of a gear with parts rotatable relative to one another in the form of a gearbox and a gear shaft.

Gear 1 in FIG. 5 differs from that shown in FIG. 3 in that the part 4 is constructed in the manner of a half-shell or gearbox and part 3 in the manner of a gear shaft 3 received by the gearbox 4 and having a smaller diameter D4 than the diameter D3 of the gearbox 3. The drive shaft 7 is e.g. operatively connected with the gearbox 4 and positioned eccentrically to the rotation axis 2 of gear 1.

Figure 6:
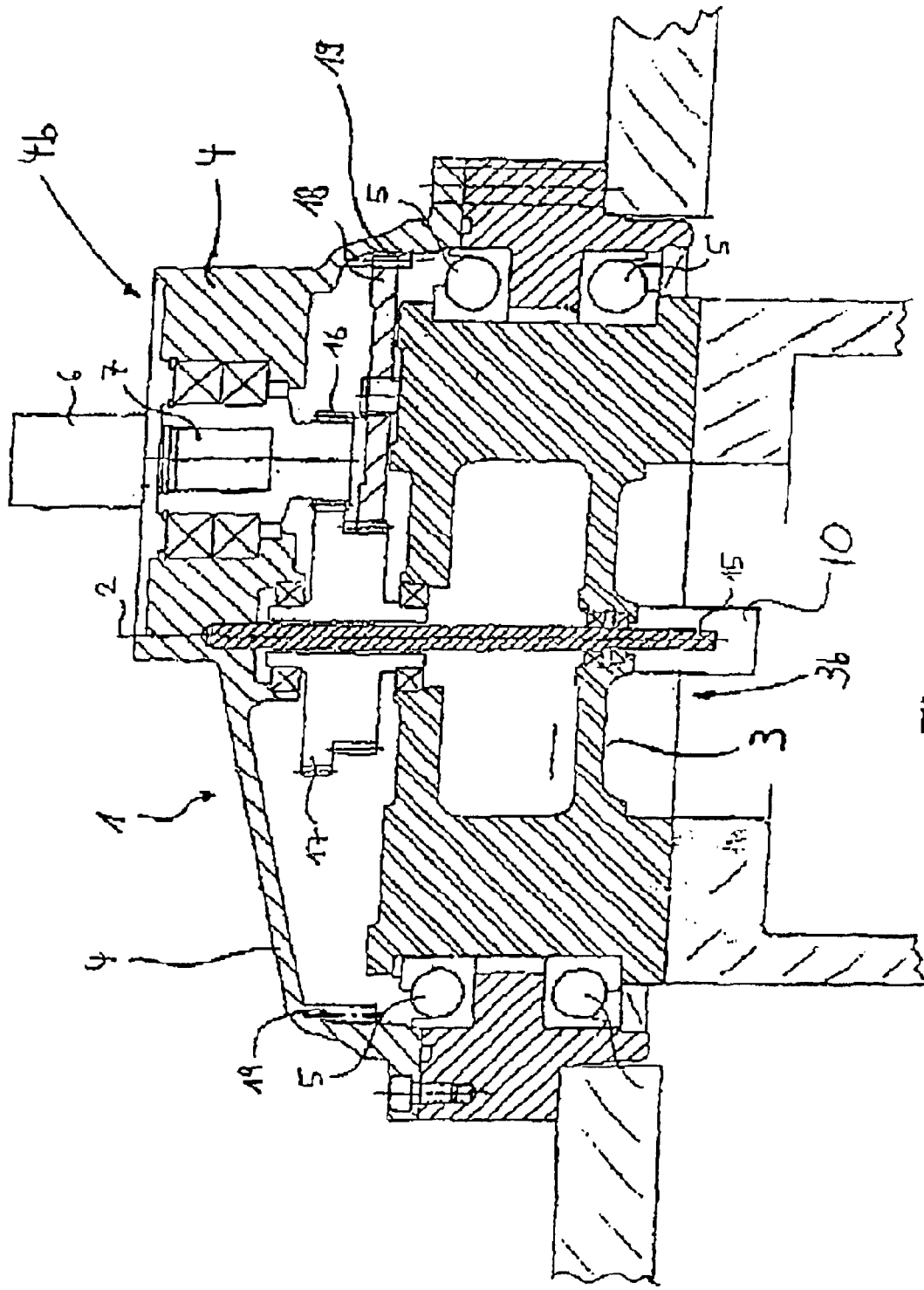
FIG. 6 A sectional view of a variant of the gear of FIG. 5.

FIG. 6 shows a section through a gear 1 with a part 3 constructed in the manner of a gear shaft, which is rotatable relative to a part 4 constructed in the manner of a gearbox. The movement of one of the parts 3, 4 can in each case be removed on the side 3b, 4b remote from the other part 4, 3. The drive shaft 7 is constituted by a driven shaft of a drive motor 6 positioned eccentrically to the rotation axis 2 of gear 1 on the side 4b of the gearbox 4 remote from the gear shaft 3. The motor casing is connected in non-rotary manner to the gear part 4.

The gear shaft 3 is mounted by means of antifriction bearings, e.g. ball bearings 5 in the gearbox 4. In order to remove the movement of the gearbox 4 with respect to the gear shaft 3 on the side 3b of said shaft 3 remote from the gearbox 4, the latter has a shaft 15, which traverses the gear shaft 3 and is connected in non-rotary manner to the gearbox 4. For transmitting the torque of the in particular high speed side drive shaft 7 is provided a gearwheel 16 located thereon and which meshes with a gearwheel 17 mounted in rotary manner on the gearbox 4, which in turn is in engagement with a gearwheel 18 connected in non-rotary manner to the gear shaft 3. Planet wheel 18 further on meshes with an internal gear 19 formed on the interior wall of the gearbox 4. The gearwheels 16, 17, 18 make it possible to increase the torque of the drive motor 6 and bridge the eccentric arrangement of its drive shaft 7 with respect to the gear axis 2.

Figure 7:
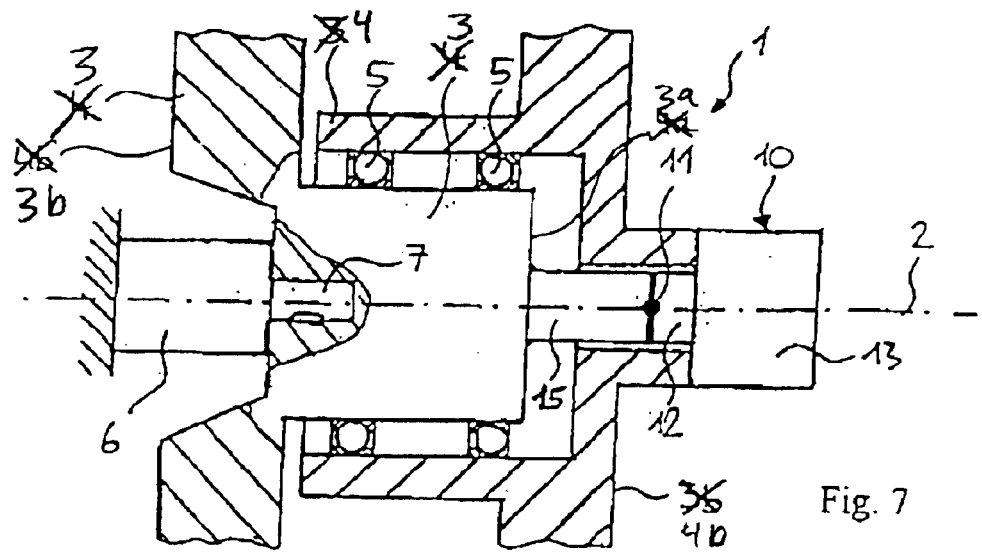
FIG. 7 A diagrammatic sectional view of a gear with parts rotatable relative to one another in the form of a gearbox and a gear shaft with sensor device.

The gear 1 shown in FIG. 7 has a first part 3 in the form of a gear shaft, which is coaxially mounted by means of bearings 5 in another part 4 in the form of a gearbox and can be rotated relative thereto. With its drive shaft 7 for pivoting the gear shaft 3 about a rotation axis 2 of a not shown, multiaxial robot, the drive motor 6 engages on the latter. The gearbox 4 can be arranged e.g. in stationary manner on a frame of a robot base, whereas the gear shaft 3 carries a carousel with the robot. In this case the rotation axis 2 is the robot Al axis. Alternatively there can only be one bearing 5 for mounting the gear shaft 3 in the gearbox 4. It is also possible to have a mounting outside the gear by means of the robot components (not shown) located on the gearbox 4 and gear shaft 3.

For determining and monitoring the rotation angle of the gear shaft 3 with respect to the gearbox 4 a sensor device 10 is positioned coaxially to the robot rotation axis 2. The sensor device 10 comprises a stub shaft 12 guided in a sensor casing or receptacle and which is connected in non-rotary manner by means of a coupling 11 to a shaft 15 of the gear shaft 3 projecting to the gearbox 4 and determines the rotation angle between stub shaft 12 and receptacle 13. The receptacle 13 of the sensor device 10 is located on the outside 4b of the e.g. stationary gearbox 4 remote from the gear shaft 3 and the stub shaft 12 connected by means of the coupling 11 to the gear shaft 3 engages in the gearbox 4. The coupling 11 can e.g. be constructed as a compression or bellows coupling or the like. The drive motor 6 on gear shaft 3 is positioned centrally to the rotation axis 2 in the construction shown.

The sensor device 10 is e.g. constructed as a monitoring device for determining and/or monitoring the rotation angle between the gearbox 4 and gear shaft 3 and is connected e.g. to a torque compensator for the robot rotation axis 2 (not shown).

Figure 8:
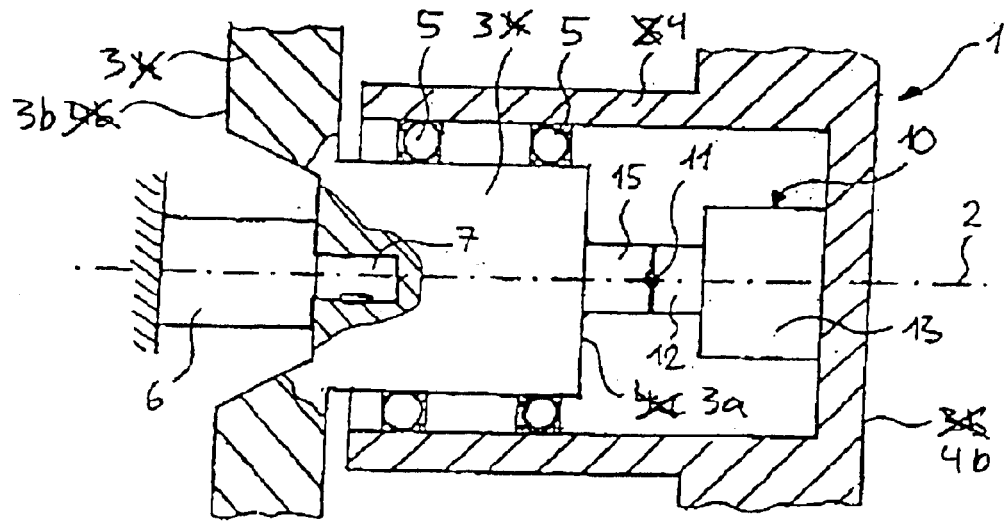
FIG. 8 A diagrammatic sectional view of a variant of the gear of FIG. 7.

The construction of FIG. 8 differs from that of FIG. 7 in that the sensor device 10 is located on the inside of the gearbox 4 facing the gear shaft 3. The receptacle 13 of the sensor device 10 is once again firmly connected to the e.g. stationary gearbox 4, whilst the stub shaft 12 is connected in non-rotary manner by means of coupling 11 to the shaft 15 of gear shaft 3 projecting to the gearbox 4. Obviously e.g. also the receptacle 13 of the monitoring device 10 can be connected in non-rotary manner to the gear shaft 3 and the stub shaft 12 can be placed on the gearbox 4 (not shown).

Figure 9:
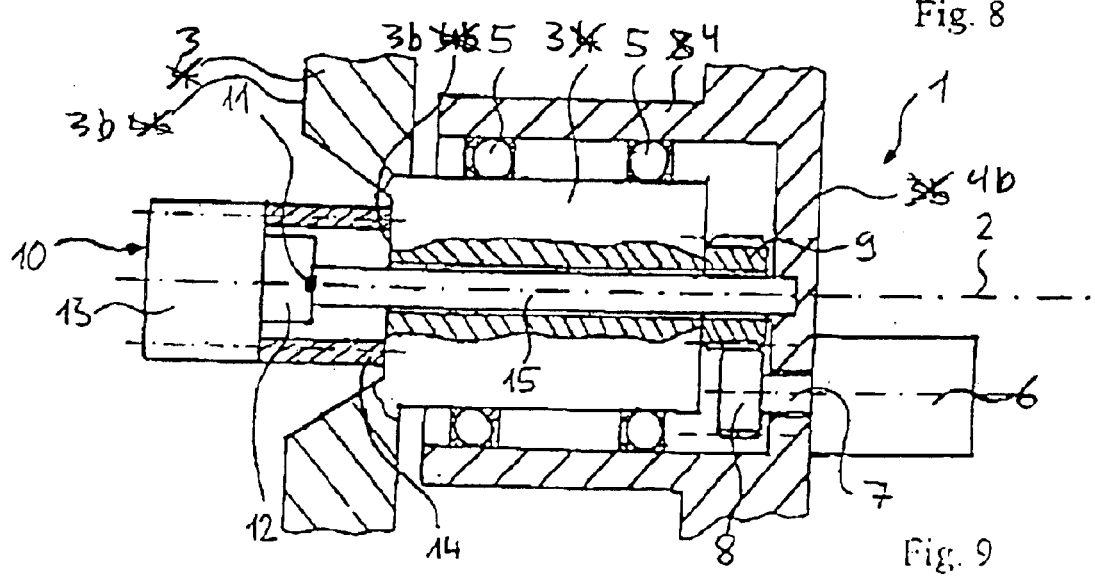
FIG. 9 A diagrammatic sectional view of another gear embodiment with integrated sensor device.

FIG. 9 shows a gear 1 with a gear shaft 3 mounted by means of bearings Sin a gearbox 4. For driving the gear shaft 3 is provided a drive motor 6 arranged eccentrically on the gearbox 4 with respect to it. rotation axis 2 with a gearwheel S located on a drive shaft 7 traversing the gearbox 4 and which meshes with a gearwheel 9 connected in non-rotary manner to the gear shaft 3. For determining and monitoring the rotation angle of the gear shaft 3 with respect to the e.g. stationary gearbox 4, there is once spin a sensor device 10 positioned coaxially to the rotation axis 2 and which is constructed in the same way as sensor device 10 in FIGS. 7 and 8 and which determines the rotation angle between the stub shaft 12 guided in the receptacle 3 and the latter. As can be gathered from the drawing, the sensor device 1C integrated into the gear 1 is in the case, for space reasons, located in the vicinity of the face 3b of the gear shaft 3 remote from the gearbox 4. By means of a sleeve 14, the receptacle 13 of the sensor device 10 is fixed in non-rotary manner on the gear shaft 3, whereas the stub shaft 12 by means of coupling 11 is connected with a shaft 15 of the gearbox 4 traversing the gear shaft 3 to its side 3b remote from the gearbox 4.

Figure 10:
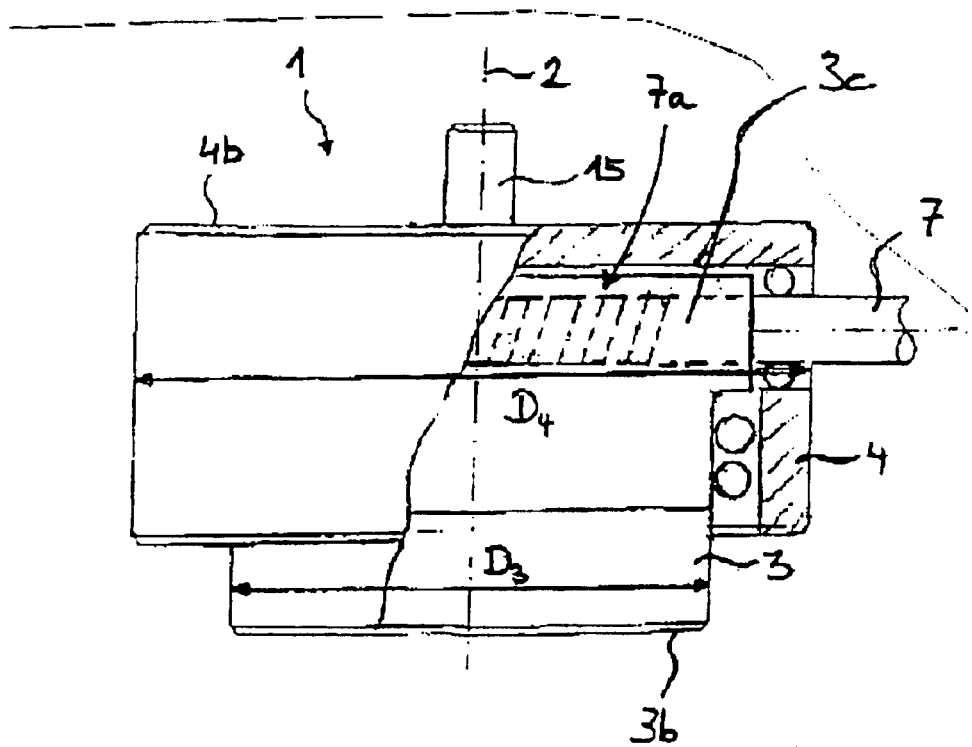
FIG. 10 is a diametrically partly broken away sectional view of another gear embodiment.

FIG. 10 shows details from the basic embodiment depicted in previously discussed FIG. 2. The drive shaft 7 has a worm gear in its end portion 7a that meshes with a worm gear formed in an upper area 3c of the gear shaft 3.

Figure 11:
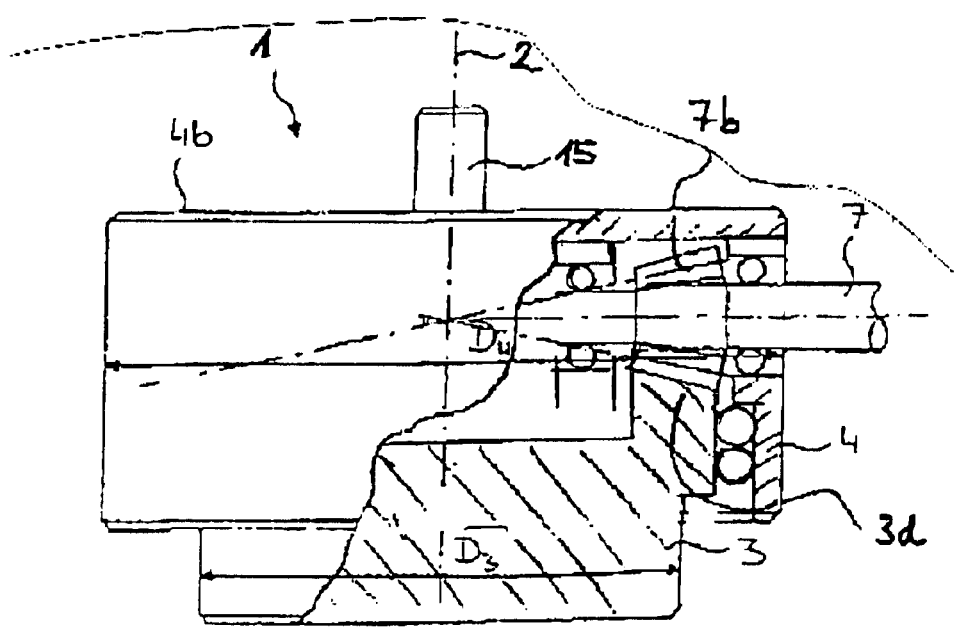
FIG. 11 is a diagrammatic partially broken away sectional view of another gear embodiment.

FIG. 11 shows details from another embodiment derived from the basic embodiment depicted in FIG. 2. The embodiment of FIG. 11 differs from the embodiment shown in FIG. 10, in that the drive shaft 7 comprises a bevel pinion 7b which meshes with a bevel gear formed in an area 3d of the gear shaft 3.

Figure 12:
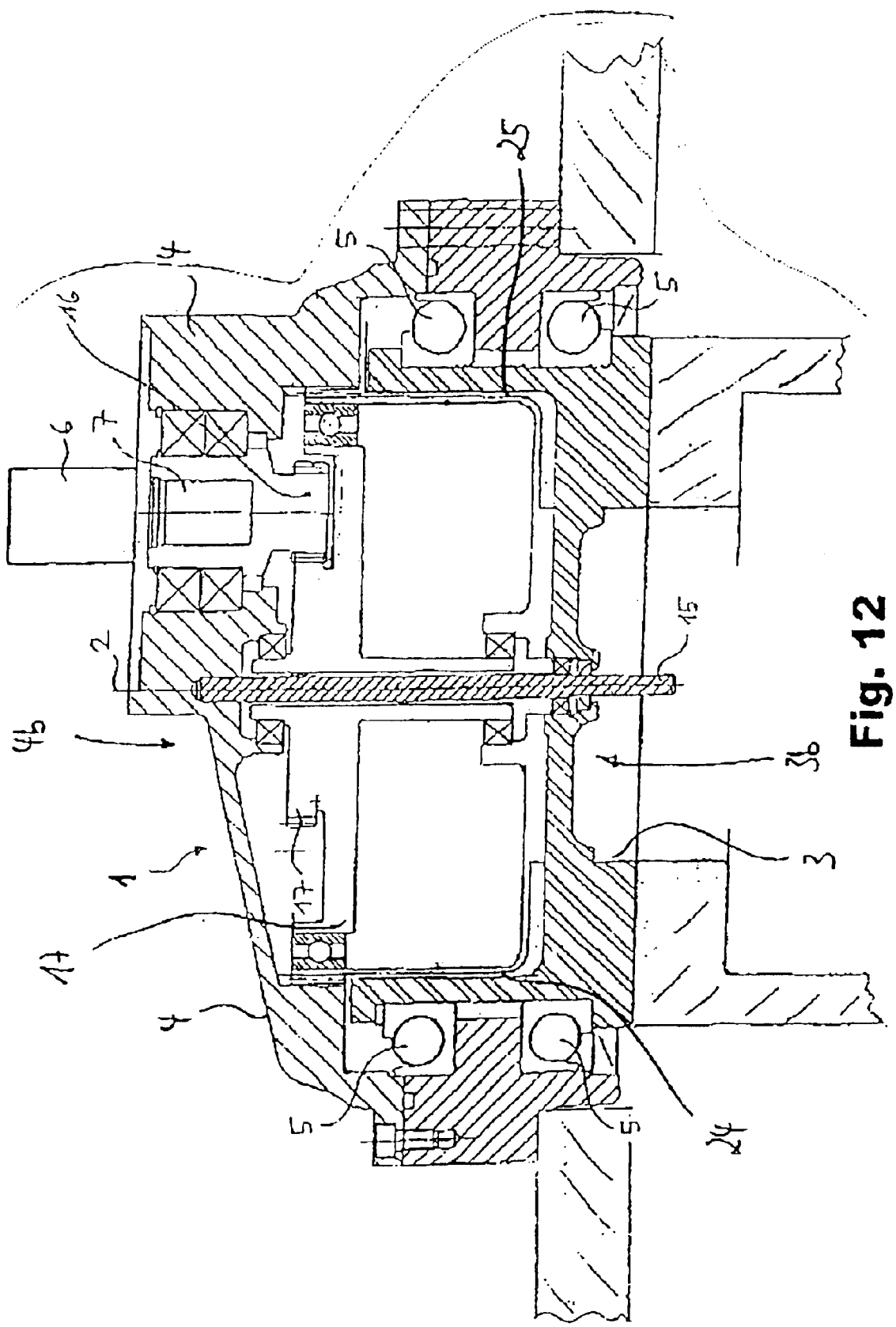
FIG. 12 is a sectional view of another variant of the gear of FIG. 6.

The embodiment of FIG. 12 differs from that in FIG. 6, in that there is no gearwheel 18. Instead FIG. 12 shows the gear 1 of the present invention including a harmonic drive gear 17, 24 and 25. Harmonic drive gears are known, such as from U.S. Pat. No. 4,840,090.

Alternatively it is possible to provide on the gear shaft 3 a not shown shaft traversing the gearbox 4 to its side remote from the gear shaft 3 and on which can be located with respect to the gearbox 4 the sensor device.

What is claimed is:

1. Gear for a robot having a drive shaft and first and second parts rotatable relative to the drive shaft and to one another, in which a movement of the first part is removable on a first end side remote from the second part, characterized in that at least one of the first parts part has a reference shaft connected in non-rotary manner thereto and which projects at least to the other part, said movement of said first part is additionally removable by means of said shaft on a second side facing said second part and remote from said first end side, an axis of said reference shaft is radially spaced from an axis of said drive shaft;

a bearing rotatably connects said first and second parts.

2. Gear according to claim 1, wherein: the shaft located on one part traverses the other part to its side remote from the one part.

3. Gear according to claim 1, wherein: the shaft located on the one part is the drive of a sensor device located in and/or on the other part.

4. Gear according to claim 3, wherein: the sensor device is a monitoring device for determining and/or limiting the rotation parameters.

5. Gear according to claim 3, wherein: the sensor device has a stub shaft guided in a receptacle and determines the rotation angle between stub shaft and receptacle.

6. Gear according to claim 5, wherein: a receptacle of the sensor device is located on one part and the stub shaft is connected in non-rotary manner to the shaft located on the other part.

7. Gear according to claim 3, wherein: an optical sensor device is provided.

8. Gear according to claim 3, wherein: a magnetic sensor device is provided.

9. Gear according to claim 3, wherein: an electrical or electromagnetic sensor device is provided.

10. Gear according to claim 3, wherein: a torque compensator connected to the sensor device is provided for the robot rotation axis.

11. Gear according to claim 1, wherein: the shaft located on one part is subject to a torque.

12. Gear according to claim 11, wherein: an auxiliary motor is provided on the shaft.

13. Gear according to claim 1, wherein: the drive shaft is a high speed side driven shaft of a drive motor or is connectable thereto.

14. Gear according to claim 1, wherein: the rotary parts are movable at a lower speed than the drive shaft.

15. Gear according to claim 1, wherein: the shaft is positioned coaxially to the rotation axis of at least one of the parts.

16. Gear according to claim 1, wherein: the parts are positioned coaxially.

17. Gear according to claim 1, wherein: the gear is a high speed reducing spur, bevel, worm or epicyclic gear.

18. Gear according to claim 1, wherein: the gear is a harmonic drive gear.

19. Gear according to claim 1, wherein: the drive motor is positioned centrally to the rotation axis of at least one of the parts.

20. Gear according to claim 1, wherein: the chive motor is positioned eccentrically to the rotation axis of at least one of the parts.

21. Gear according to claim 1, wherein: the drive motor is positioned under a mite angle with respect to the rotation axis of at least one of the parts.

22. Gear according to claim 21, wherein: the drive motor is placed approximately under a right angle with respect to the rotation axis of at least one of the parts.

23. Gear according to claim 1, wherein: one part is constructed as a gearbox and the other pan as a gear shaft.

24. Robot, comprising: at least one gear according to one of the claims 1 to 23.

* * * * *